Feb. 13, 1940. W. SEMENYNA 2,190,196
ELECTRIC MOLDING
Filed Dec. 10, 1937 2 Sheets-Sheet 2

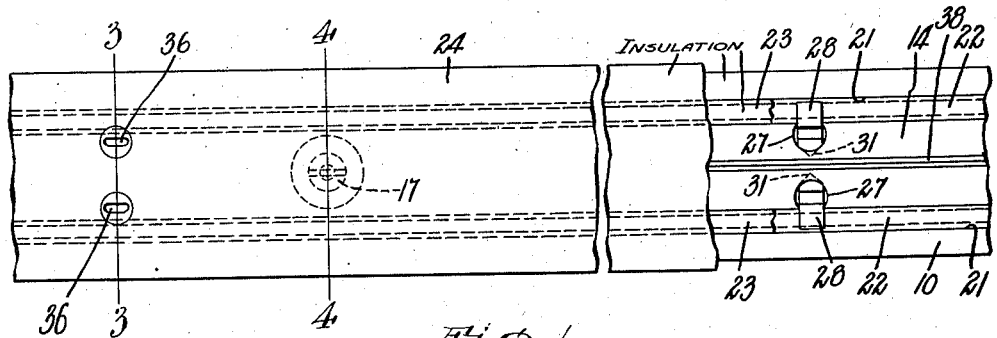
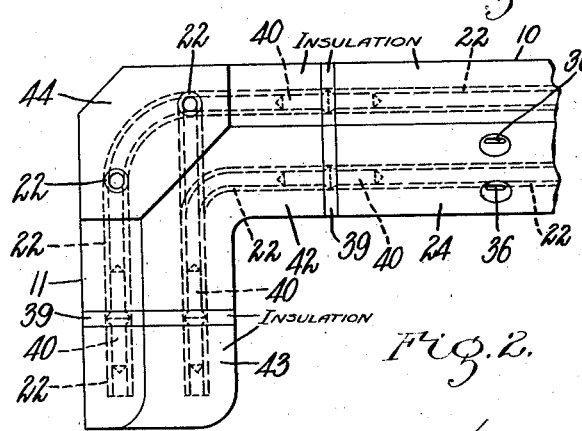
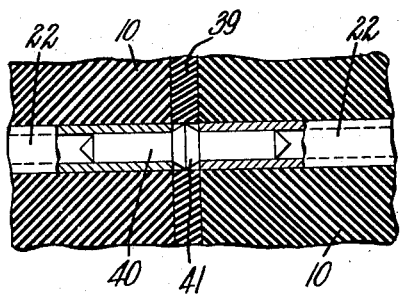
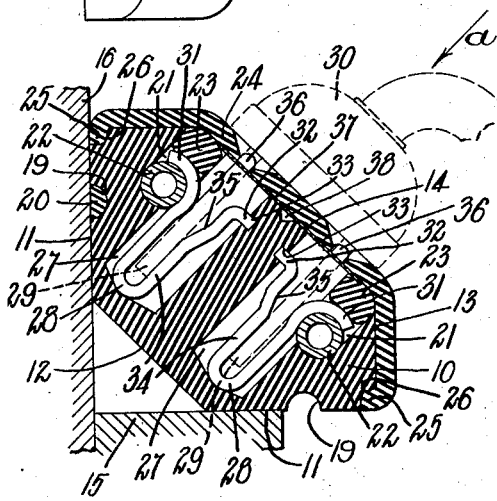
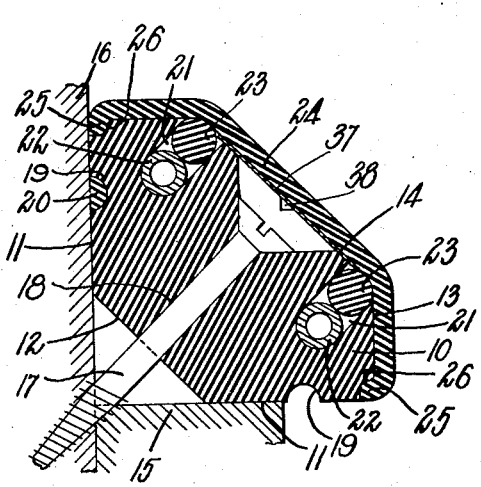

Inventor:
Waldimir Semenyna.
by Franklin E. Low,
Atty.

Patented Feb. 13, 1940

2,190,196

UNITED STATES PATENT OFFICE 2,190,196

ELECTRIC MOLDING

Waldimir Semenyna, Boston, Mass.

Application December 10, 1937, Serial No. 179,129

4 Claims. (Cl. 173—334.1)

This invention relates to an electric molding structure and has for its object to provide a safe, practical electric molding of pleasing appearance which may be attached to the walls of rooms along the top edges of base boards, and around the edges of door and window casings, and to the surfaces of counters and store fixtures, or at any other location where it may be desirable to provide a plurality of sockets or outlets at convenient locations to which electric lamps or any other well-known form of electrical appliance may be easily and quickly attached by means of a well-known type of electric terminal plug.

Another object of the invention is to provide a molding structure including corner and angle members having electric conductors embodied therein which may be coupled one to another during installation to continue the electric circuit therethrough without it being necessary to use tools or solder connections.

Another object of the invention is to provide an electric molding structure which may be safely installed by persons not usually considered skilled in the electrical art.

Still another object of the invention is to provide a cover plate for the molding structure which may be sprung into position thereon.

The invention consists in an electrical molding structure as set forth in the following specification and particularly as pointed out in the claims.

Referring to the drawings:

Fig. 1 is a front elevation of a portion of a strip of electric molding embodying my invention, viewing said strip from the direction of the arrow Fig. 3, a portion of the cover plate for the molding being broken away to expose the molding structure located therebeneath.

Fig. 2 is a plan view illustrating corner and end members for the molding structure of this invention.

Fig. 3 is an enlarged transverse section through the molding as taken on the line 3—3 of Fig. 1.

Fig. 4 is an enlarged transverse section through the molding as taken on the line 4—4 of Fig. 1.

Fig. 5 is a detail sectional view illustrating a coupling member for the adjacent end portions of two electric conductors for the molding.

Like numerals refer to like parts throughout the several views of the drawings.

Figure 6:
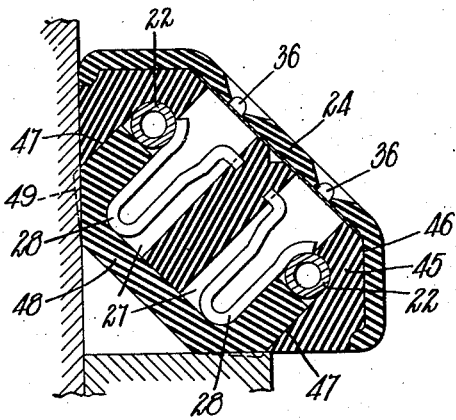
Figs. 6 and 7 are sectional views corresponding to Figs 3 and 4 respectively, illustrating a modified molding structure embodying my invention.

In the drawings, referring particularly to Figs. 1 to 5 inclusive, 10 represents a molding strip or core of any desired length and formed of any suitable material, preferably an insulating material. The strip 10 is provided with flat rear faces 11 positioned at an angle of ninety degrees to each other, a chamfered face 12 intersecting the two faces 11, and a front face 13 provided with a chamfered portion 14 which extends parallel with the rear chamfered surface 12. The molding strip 10 is constructed and arranged to be attached to the surfaces of walls at their intersections with other surfaces, as, for example, the flat top edges of base boards and the edges of door and window casings, and in Figs. 3 and 4 a horizontal face 11 of a strip 10 is illustrated as resting upon a flat top surface of a base board 15, while a vertical face 11 of said strip rests against the surface of a wall 16 to which it is attached by means of screws 17 which extend through holes 18 provided at regular intervals in the strip and extending diagonally therethrough. A groove 19 is provided in each face 11 of the molding strip 10 extending lengthwise thereof, and when attaching a strip to a flat surface a strand of compressible material 20, as, for example, rubber, may be inserted in said groove and be compressed therein to provide a tight engagement with the surfaces contacted.

The front face 13 of the molding strip 10 is provided with grooves 21 which extend lengthwise of said strip, and mounted in each groove is a tubular electric conducting member 22. A strand of compressible insulating material 23, as, for example, rubber is inserted in each groove 21 above the electric conducting member 22. The insulating material 23 is held within the grooves 21 and against the electric conductors 22 by means of a cover plate 24 which covers the entire front face 13 of the molding strip 10. The cover plate 24 is preferably constructed of laminated Bakelite or similar material and has inwardly projecting flange portions 25 extending along the opposite edges thereof which are adapted to be sprung into grooves 26 provided therefor in the molding strip.

Positioned in pairs at regular intervals in the molding strip 10 and extending rearwardly from the front face 13 thereof are holes 27 in which resilient electric contact members 28 are mounted to be contacted by the prongs 29 of an electric terminal plug 30 of well-known type and represented in dotted lines in Fig. 3. The contact members 28 are approximately U-shaped in formation and embody therein an arcuate end portion 31 which contacts with the periphery of an electric conductor 22 and is preferably soldered thereto to make an effective electric connection therewith. The other end portion of each electric contact member 28 is pointed at 32 and projects into a recess 33 provided therefor in the side of the hole 27. The electric contact members are thus firmly seated side by side in separate holes 27 and are insulated one from another by the material of the molding strip. Side portions 34 of the electric contact members 28 are parallel one with the other and are yieldable with respect to each other to effectively grip the prongs 29 of the electric terminal plug 30; and one side portion of each contact member is bent at 35 to facilitate the insertion of said prongs between said side portions 34. Slots 36 are provided in the cover plate 24 in alignment with the holes 27 to receive the prongs 29. A piece of paper 37 which may be easily perforated by the prongs 29 is applied to the rear surface of the cover plate 24 over the slots 36. A shallow V-shaped groove 38 is provided in the front face 13 of the molding strip 10 and extends lengthwise thereof to provide a positioning line for a drill when it is necessary during installation to provide additional holes 18 for the reception of fastening screws 17.

During installation gaskets 39 constructed of suitable insulation material, preferably rubber, are inserted between the adjacent end portions of the molding strips 10 and said strips are electrically connected one to another by means of metal dowel pins 40 which are inserted in the end portions of the tubular electric conductors 22 as illustrated in detail in Fig. 5. A central enlarged portion 41 is provided upon the dowel pins 40 for the purpose of correctly positioning said pins within the electric conducting members.

In Fig. 2 a corner molding member 42 and an end molding member 43 with electric conducting members 22 therein are illustrated connected one to another and to a molding strip 10 by dowel pins 40. Gaskets 39 are interposed between the adjacent end portions of the members 10, 42 and 43. A flat surface 44 is provided upon the top surface of the corner member 42, and tubular electric conducting members 22 terminate flush with said surface for the purpose of having a vertically disposed molding strip 10 electrically connected thereto by dowel pins 40 as previously described. The members 42 and 43 are of the same cross-sectional contour as the molding strip 10.

The electric molding structure hereinbefore described is particularly adapted to be applied at the intersections of flat surfaces that are positioned at an angle of ninety degrees to each other. Where corners are turned, angle members 42, or equivalent structures, are utilized, and at the end of a line end members or caps 43 are utilized; all of these members being spaced apart by insulating gaskets 39 and electrically connected one to another by dowel pins 40.

After the molding strips 10 and other fittings hereinbefore mentioned are secured in position the cover plates 24 are sprung into position upon said strips. The molding structure may be easily and quickly cut to length and assembled to provide a safe structure by persons not usually considered skilled in this art. The numerous outlets provided for the reception of electric plugs and which in effect are sockets embodied in the molding structure makes it possible to attach electrical devices wherever desired in a room where the molding structure of this invention is installed.

Figure 7:
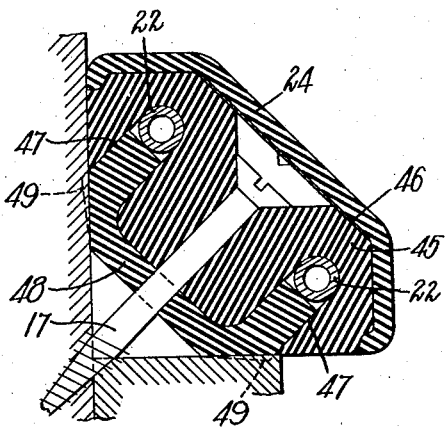

In Figs. 6 and 7 I have illustrated another form of molding structure embodying my invention, but in which the electric conductors are inserted from the rear of the molding strip instead of from the front. In this structure a molding strip 45 of insulating material having a front face 46 of the same general formation and appearance as the structure previously described is provided with parallel grooves 47 at the rear thereof which extend lengthwise thereof in which tubular electric conductors 22 are mounted and held by means of a channel shaped strip of compressible insulating material 48, as, for example, rubber. Corner portions 49 of the strip 48 are so formed that when the molding strip 45 is mounted in a corner location, the corner portions 49 will be compressed inwardly to provide a tight engagement with the surfaces contacted. The strip 45 is secured to a wall or other location by screws 17, and the front face 46 thereof is covered by means of a plate 24 having slots 36 provided therein. Holes 27 extend through the strip 45 from front to rear, and electric contact members 28 are mounted in said holes and are attached to the electric conducting members 22 as previously described in connection with the structure disclosed in Figs. 1 to 5 inclusive. In application and general utility, the molding structure disclosed in Figs. 6 and 7 is the same as that disclosed in Figs. 1 to 5 inclusive.

Figure 8:
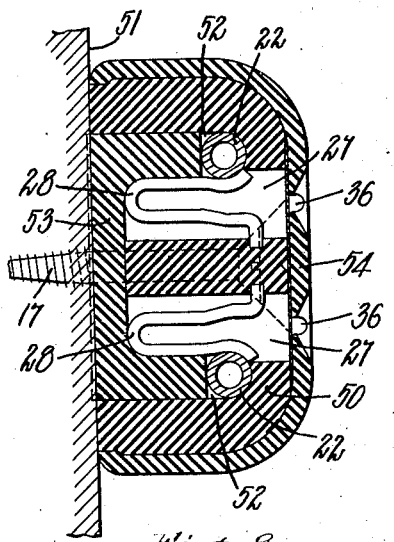
Fig. 8 is a sectional view corresponding to Fig. 3 illustrating another modified embodiment of the invention.

In Fig. 8 I have illustrated another modified embodiment of my invention in which a molding strip 50 of approximately rectangular cross-sectional contour and adapted to be attached to a flat surface 51 is provided with parallel grooves 52 at the rear thereof which extend lengthwise thereof and in which tubular electric conducting members 22 are mounted and held by means of a channel-shaped strip of compressible electric insulating material 53, as, for example, rubber. The rear surface of the material 53 is normally located at the position illustrated in dotted lines and is compressed when the molding strip is attached to a flat surface. The strip 50 is secured to a wall or other location by screws 17, and the exposed face of said strip is covered by means of a plate 54 preferably formed of Bakelite. Holes 27 extend rearwardly from the front face of the strip 50, and electric contact members 28 are mounted in said holes and are attached to the electric conducting members 22 as previously described. The general utility of this molding structure is substantially the same as the structures hereinbefore described.

Figure 9:
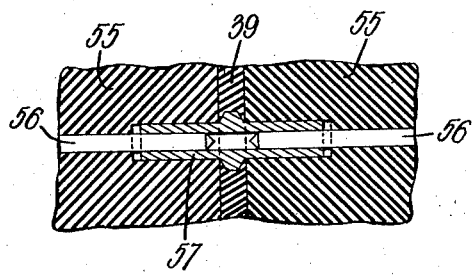
Fig. 9 is a sectional view corresponding to Fig. 5 illustrating modified electric conductors and a coupling member therefor.

In Fig. 9 I have illustrated an alternate type of electric conducting member for a molding strip 55 formed as a wire or slender rod 56, and adjacent end portions of said electric conducting members are electrically connected together by means of a sleeve 57 which is applied to said end portions. It is furthermore evident that well-known forms of insulated electric wire may be utilized in the molding strips of this invention and that the end portions of the wires of adjacent molding strips may be electrically connected together by the sleeves 57 which may be applied to bare end portions of said wire.

It is evident that the various embodiments of this invention herein illustrated and described are of the same general structure and may be utilized in the same manner to provide numerous outlets or sockets in the molding structure to which the plugs of all types of electrical appliances may be instantly attached.

I claim:

1. An electric molding of the character described comprising, in combination, a core provided with grooves extending longitudinally thereof, an electric conducting member mounted within each of said grooves, a yieldable electric contact member connected to each conducting member and adapted to be engaged by the prongs of an electric terminal plug, and a compressible material at the rear of said core adapted to yieldingly engage a surface to which the molding is attached.

2. An electric molding of the character described comprising, in combination, a core of insulating material provided with grooves extending longitudinally thereof and with openings grouped in pairs and communicating with said grooves, an electric conducting member mounted within each of said grooves, a strip of flexible insulating material covering said conducting members and yieldingly holding the latter seated in said grooves, and an electric contact member permanently mounted in each of said openings and connected to a conducting member.

3. An electric molding of the character described comprising, in combination, a core of insulating material provided with grooves extending longitudinally thereof and with openings grouped in pairs beside said grooves, a tubular electric conducting member mounted within each of said grooves, a strip of channel shaped insulating material holding said electric conducting members seated in said grooves, and an electric contact member mounted in each of said openings and connected to a conducting member.

4. An electric molding of the character described comprising, in combination, a core of insulating material provided with grooves extending longitudinally thereof and with openings grouped in pairs beside said grooves, a tubular electric conducting member mounted within each of said grooves, a strip of compressible insulating material yieldingly holding said electric conducting members seated in said grooves, and an electric contact member mounted in each of said openings and connected to a conducting member and adapted to be engaged by the prongs of an electric terminal plug.

WALDIMIR SEMENYNA.